ated under 35
United States Patent
Zhu et al.

(10) Patent No.: US 9,181,500 B2
(45) Date of Patent: Nov. 10, 2015

(54) PROCESS AND APPARATUS FOR RECYCLING CRACKED HYDROCARBONS

(71) Applicant: UOP LLC, Des Plaines, IL (US)

(72) Inventors: Xin X. Zhu, Long Grove, IL (US); Trung Pham, Mount Prospect, IL (US); Selman Z. Erisken, Chicago, IL (US); Haiyan Wang, Hoffman Estates, IL (US); David X. Wu, Barrington, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 14/225,403

(22) Filed: Mar. 25, 2014

(65) Prior Publication Data

US 2015/0273425 A1    Oct. 1, 2015

(51) Int. Cl.
| | |
|---|---|
| *C10G 69/04* | (2006.01) |
| *B01J 8/22* | (2006.01) |
| *B01D 3/00* | (2006.01) |
| *B01J 8/18* | (2006.01) |

(52) U.S. Cl.
CPC .............. *C10G 69/04* (2013.01); *B01D 3/009* (2013.01); *B01J 8/1863* (2013.01); *B01J 8/22* (2013.01)

(58) Field of Classification Search
CPC ........ C10G 69/04; B01J 8/1845; B01J 8/1863
See application file for complete search history.

(56) References Cited

U.S. PATENT DOCUMENTS

| | | | |
|---|---|---|---|
| 3,891,538 A | 6/1975 | Walkey | |
| 4,426,276 A * | 1/1984 | Dean et al. ...................... | 208/60 |
| 4,713,221 A | 12/1987 | Montgomery et al. | |
| 4,985,134 A | 1/1991 | Derr, Jr. et al. | |
| 5,009,768 A * | 4/1991 | Galiasso et al. ................ | 208/89 |
| 5,080,777 A | 1/1992 | Aegerter, Jr. et al. | |
| 5,382,349 A | 1/1995 | Yoshita et al. | |
| 5,685,972 A | 11/1997 | Timken et al. | |
| 5,705,052 A * | 1/1998 | Gupta ............................. | 208/57 |
| 7,591,939 B2 | 9/2009 | Benham | |
| 7,601,254 B2 | 10/2009 | Gosling | |
| 7,718,050 B2 | 5/2010 | Gueret et al. | |
| 8,404,103 B2 | 3/2013 | Dziabala et al. | |
| 8,481,797 B2 | 7/2013 | Smith et al. | |
| 8,551,324 B2 | 10/2013 | Feugnet et al. | |
| 8,608,942 B2 | 12/2013 | Subramanian et al. | |

(Continued)

FOREIGN PATENT DOCUMENTS

| | | |
|---|---|---|
| EP | 2673341 A2 | 12/2013 |
| EP | 2690160 A1 | 1/2014 |

(Continued)

OTHER PUBLICATIONS

Chen, "Residue Catalytic Cracking to Produce Light Olefins and Gasoline", Symposium on Petroleum Chemistry and Processing, presented before the Division of Petroleum Chemistry, Inc., 210th National Meeting, American Chemical Society, Chicago, IL, Aug. 20-25, 1995, pp. 773-775.

(Continued)

*Primary Examiner* — Lessanework Seifu
(74) *Attorney, Agent, or Firm* — James C. Paschall

(57) ABSTRACT

A process and apparatus for recycling LCO and/or HCO to a hydroprocessing zone to saturate aromatics for cracking in an FCC unit is disclosed. The recycle cracked stream may be recycled to a downstream hydroprocessing zone to avoid a first hydroprocessing zone that is primarily for demetallizing (and desulfurizing) feed to the FCC unit.

20 Claims, 1 Drawing Sheet

(56) References Cited

U.S. PATENT DOCUMENTS

| | | |
|---|---|---|
| 2001/0031227 A1 | 10/2001 | Lomas |
| 2006/0131212 A1 | 6/2006 | Dahlberg et al. |
| 2009/0127161 A1 | 5/2009 | Haizmann et al. |
| 2009/0288985 A1 | 11/2009 | Long et al. |
| 2011/0056870 A1 | 3/2011 | Rispoli et al. |
| 2011/0207979 A1 | 8/2011 | Kim et al. |
| 2011/0303582 A1 | 12/2011 | Niccum et al. |
| 2012/0091037 A1 | 4/2012 | Feugnet et al. |
| 2012/0141333 A1* | 6/2012 | Ulas Acikgoz et al. ....... 422/187 |
| 2012/0205285 A1 | 8/2012 | Dindi et al. |
| 2012/0222991 A1 | 9/2012 | O'Connor et al. |
| 2013/0130889 A1 | 5/2013 | Gbordzoe et al. |
| 2013/0140215 A1 | 6/2013 | Diehl et al. |
| 2013/0248419 A1 | 9/2013 | Abba et al. |
| 2013/0281749 A1 | 10/2013 | Feugnet et al. |

FOREIGN PATENT DOCUMENTS

| | | |
|---|---|---|
| WO | 2006131621 A2 | 12/2006 |
| WO | 2010101686 A2 | 9/2010 |
| WO | 2011025802 A1 | 3/2011 |
| WO | 2011025803 A1 | 3/2011 |
| WO | 2011156383 A1 | 12/2011 |
| WO | 2012022852 A2 | 2/2012 |
| WO | 2012024193 A2 | 2/2012 |
| WO | 2012058396 A2 | 5/2012 |
| WO | 2012135403 A1 | 10/2012 |

OTHER PUBLICATIONS

Light, "New Zeolite Technology for Maximum Midbarrel Production", NPRA Annual Meeting, San Antonio, Texas, Mar. 29-31, 1981.

Whatley, "Fast-Tracking an FCC Revamp", Petroleum Technology Quarterly, v 11, n Suppl., pp. 13-19, 2006.

Williams, "Heavy Oil Processing; Fluid Catalytic Cracking Process", 1993 NPRA Question and Answer Session on Refining and Petrochemical Technology.

U.S. Appl. No. 14/225,402, filed Mar. 25, 2014.

Search Report dated May 28, 2015 for corresponding PCT Appl. No. PCT/US2015/021366.

* cited by examiner

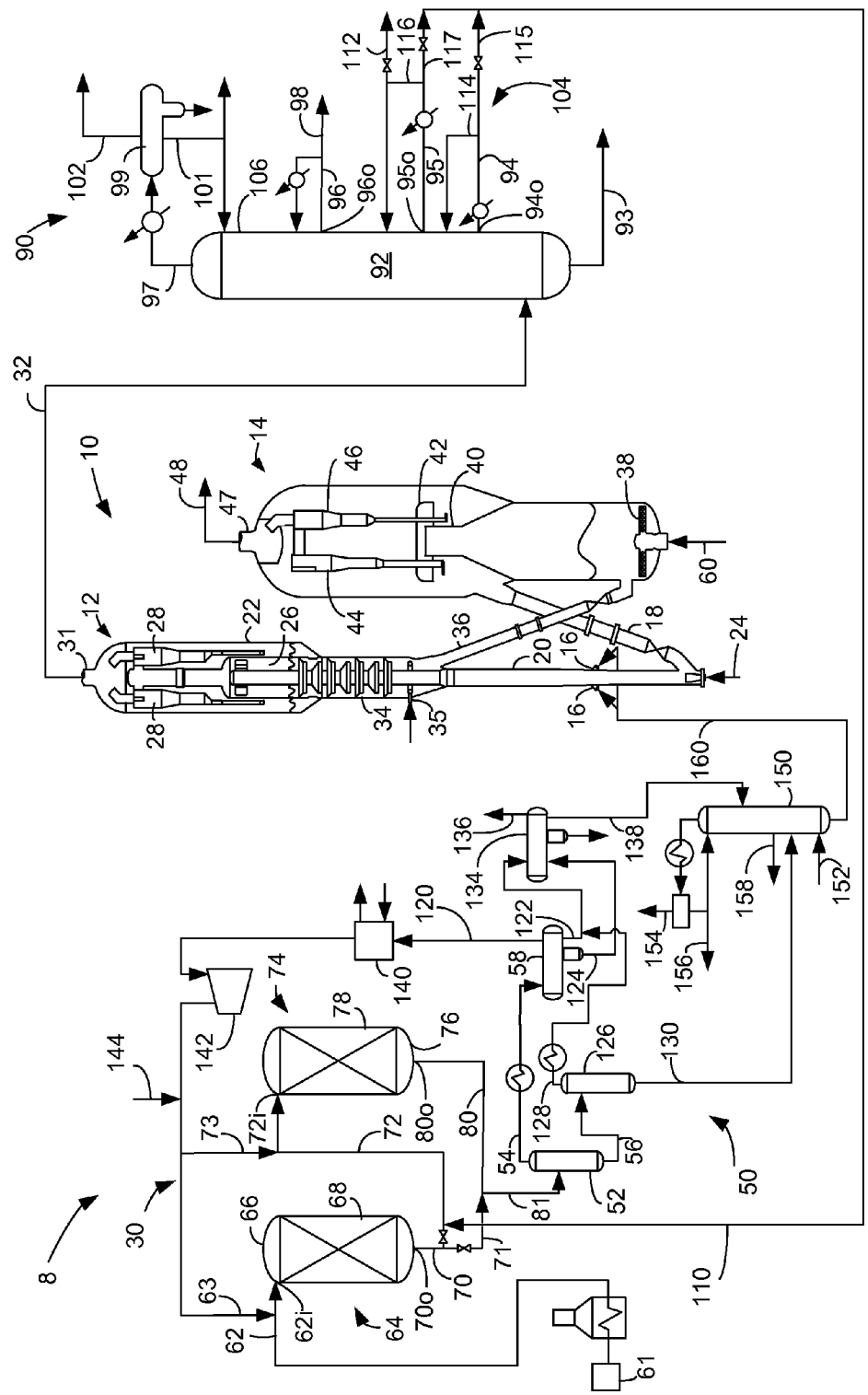

PROCESS AND APPARATUS FOR RECYCLING CRACKED HYDROCARBONS

BACKGROUND OF THE INVENTION

The field of the invention is fluid catalytic cracking (FCC).

FCC technology, now more than 50 years old, has undergone continuous improvement and remains the predominant source of gasoline production in many refineries. This gasoline, as well as lighter products, is formed as the result of cracking heavier, less valuable hydrocarbon feed stocks such as gas oil.

In its most general form, the FCC process comprises a reactor that is closely coupled with a regenerator, followed by downstream hydrocarbon product separation. Hydrocarbon feed contacts catalyst in the reactor to crack the hydrocarbons down to smaller molecular weight products. During this process, coke tends to accumulate on the catalyst which is burned off in the regenerator.

It has been recognized that due to environmental concerns and newly enacted rules and regulations, saleable petroleum products must meet lower and lower limits on contaminates, such as sulfur and nitrogen. New regulations require essentially complete removal of sulfur from liquid hydrocarbons that are used in transportation fuels, such as gasoline and diesel.

Hydroprocessing is a process that contacts a selected feedstock and hydrogen-containing gas with suitable catalyst(s) in a reaction vessel under conditions of elevated temperature and pressure to remove heteroatoms such as sulfur and nitrogen from hydrocarbon streams to meet fuel specifications and to saturate olefinic compounds. Hydroprocessing is also used to prepare fresh hydrocarbon feed for FCC processing by demetallizing the FCC feed. Vanadium and nickel in the FCC feed can deactivate the FCC catalyst during the FCC process.

The demand for diesel has increased over gasoline in recent years. Petrochemicals such as propylene and single ring alkyl aromatics are considered even more valuable. Light Cycle Oil (LCO) is also produced in an FCC unit and can be directed to the diesel pool. However, LCO may degrade the quality of the diesel pool due to its high aromaticity and low cetane value. Upgrading of LCO to petrochemicals would be desirable.

Heavy Cycle Oil (HCO) is also produced in the FCC unit with little use other than for fuel oil. Further conversion of the HCO to motor fuel products would also be desirable.

SUMMARY OF THE INVENTION

One embodiment of the invention is a process for catalytically cracking hydrocarbons comprising: feeding a fresh hydrocarbon feed stream to a first hydroprocessing zone to hydroprocess the hydrocarbon feed stream to provide a first hydroprocessed effluent stream; feeding a recycle cracked stream to a second hydroprocessing zone to hydroprocess the recycle cracked stream and provide a second hydroprocessed effluent stream; feeding the first hydroprocessed effluent to the second hydroprocessing zone or feeding a portion of the first hydroprocessed effluent to an FCC reactor and contacting the portion of the first hydroprocessed effluent stream with catalyst to catalytically crack the first hydroprocessed effluent to provide a cracked stream; feeding a portion of the second hydroprocessed effluent stream to an FCC reactor and contacting the portion of the second hydroprocessed effluent stream with catalyst to catalytically crack the second hydroprocessed effluent to provide a cracked stream; disengaging the catalyst from the cracked stream; and separating the recycled cracked stream from the cracked stream.

Another embodiment of the invention is an apparatus for catalytically cracking hydrocarbons comprising: a first hydroprocessing zone with an first inlet and a first outlet, the first inlet being in communication with a source of a fresh hydrocarbon feed stream; a second hydroprocessing zone with a second inlet and a second outlet; an FCC reactor in communication with the first outlet and the second outlet; a main fractionation column in communication with the FCC reactor; the main fractionation column having a main outlet, the second inlet being in downstream communication with the main outlet.

Advantageously, the process can enable the FCC unit to recycle a lower value, cracked product stream to the FCC unit to produce more of the higher value, cracked products.

Additional features and advantages of the invention will be apparent from the description of the invention, FIGURE and claims provided herein.

BRIEF DESCRIPTION OF THE DRAWING

The FIGURE is a schematic drawing of a hydroprocessing unit and an FCC unit.

DEFINITIONS

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without undergoing a compositional change due to physical fractionation or chemical conversion.

The term "bypass" means that the object is out of downstream communication with a bypassing subject at least to the extent of bypassing.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of any reflux or reboil to the column. Stripping columns omit a reboiler at a bottom of the column and instead provide heating requirements and separation impetus from a fluidized inert media such as steam.

As used herein, the term "True Boiling Point" (TBP) means a test method for determining the boiling point of a material which corresponds to ASTM D-2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, the term "T5" or "T95" means the temperature at which 5 volume percent or 95 volume percent, as the case may be, respectively, of the sample boils using ASTM D-86.

As used herein, the term "initial boiling point" (IBP) means the temperature at which the sample begins to boil using ASTM D-86.

As used herein, the term "end point" (EP) means the temperature at which the sample has all boiled off using ASTM D-86.

As used herein, the term "diesel cut point" is between about 343° C. (650° F.) and about 399° C. (750° F.) using the TBP distillation method.

As used herein, the term "diesel boiling range" means hydrocarbons boiling in the range of between about 132° C. (270° F.) and the diesel cut point using the TBP distillation method.

As used herein, the term "diesel conversion" means conversion of feed that boils above the diesel cut point to material that boils at or below the diesel cut point in the diesel boiling range.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator that may be operated at higher pressure.

As used herein, the term "predominant" or "predominate" means greater than 50%, suitably greater than 75% and preferably greater than 90%.

DETAILED DESCRIPTION

The FIGURE, wherein like numerals designate like components, illustrates an apparatus and process 8 that is equipped for processing a fresh hydrocarbon feed stream. The apparatus and process 8 generally include an FCC unit 10, a hydroprocessing unit 30, a hydroprocessing recovery section 50 and an FCC recovery section 90. The FCC unit 10 includes an FCC reactor 12 comprising a riser 20 and a catalyst regenerator 14. The fresh hydrocarbon feed may first be processed in the hydroprocessing unit 30. A conventional FCC feedstock and higher boiling hydrocarbon feedstock are suitable fresh hydrocarbon feed streams. The most common of such conventional fresh hydrocarbon feedstocks is a "vacuum gas oil" (VGO), which is typically a hydrocarbon material having a boiling range with an IBP of around or about 340° C. (644° F.), a T5 between about 340° C. (644° F.) to about 350° C. (662° F.), a T95 between about 555° C. (1031° F.) and about 570° C. (1058° F.) and an EP of around or about 570° C. (1058° F.) prepared by vacuum fractionation of atmospheric residue. Such a fraction is generally low in coke precursors and heavy metal contamination which can serve to contaminate catalyst. Atmospheric residue is a preferred feedstock boiling with an IBP of around or about 340° C. (644° F.), a T5 between about 340° C. (644° F.) and about 360° C. (680° F.) and a T95 of between about 700° C. (1292° F.) and about 900° C. (1652° F.) obtained from the bottoms of an atmospheric crude distillation column. Atmospheric residue is generally high in coke precursors and metal contamination. Other heavy hydrocarbon feedstocks which may serve as fresh hydrocarbon feed include heavy bottoms from crude oil, heavy bitumen crude oil, shale oil, tar sand extract, deasphalted residue, products from coal liquefaction, vacuum reduced crudes. Fresh hydrocarbon feedstocks also include mixtures of the above hydrocarbons and the foregoing list is not comprehensive.

In the hydroprocessing unit 30, two hydroprocessing zones 64 and 74 are shown. However, more than two hydroprocessing zones are contemplated. The fresh hydrocarbon feed stream in a fresh feed line 62 may be mixed with hydrogen from hydrogen line 63 and the mixed fresh hydrocarbon feed stream is fed to the first hydroprocessing zone 64 through a first inlet 62*i*. The first inlet 62*i* is in downstream communication with a source of a fresh hydrocarbon feed stream such as a fresh feed tank 61. Water may be added to the fresh feed in line 62. The fresh feed may be heated in a fired heater before entering the first hydroprocessing zone 64. The first hydroprocessing zone 64 may be a hydroprocessing catalyst bed in a hydroprocessing reactor vessel or it may be a hydroprocessing reactor vessel comprising one or more hydroprocessing catalyst beds. In the FIGURE, the first hydroprocessing zone 64 is a hydroprocessing reactor vessel 66 comprising a single bed 68 of hydroprocessing catalyst.

Suitable hydroprocessing catalysts for use in the first hydroprocessing zone 64 are any known conventional hydrotreating catalysts and include those which are comprised of at least one Group VIII metal, preferably iron, cobalt and nickel, more preferably nickel and/or cobalt and at least one Group VI metal, preferably molybdenum and tungsten, on a high surface area support material, preferably alumina. It is within the scope of the present invention that more than one type of hydrotreating catalyst be used in the same reaction vessel or catalyst bed. The Group VIII metal is typically present in an amount ranging from about 1 to about 10 wt %, preferably from about 2 to about 5 wt %. The Group VI metal will typically be present in an amount ranging from about 1 to about 20 wt %, preferably from about 2 to about 10 wt %. RCD-5 and RCD-8 are suitable catalysts for the first hydroprocessing zone 64 available from UOP LLC in Des Plaines, Ill. The first hydroprocessing zone 64 is intended to demetallize the fresh hydrocarbon feed stream, so to reduce the metals concentration in the fresh feed stream by about 55 to about 100% and typically about 65 to about 95% to produce a first hydroprocessed effluent stream in a first effluent line 70 exiting the first hydroprocessing zone through a first outlet 70*o*. The metal content of the first hydroprocessed effluent stream may be less than about 200 wppm and preferably between about 5 and about 75 wppm. The first hydroprocessing zone 64 may also desulfurize and denitrogenate the fresh hydrocarbon stream in fresh feed line 62.

A portion of the first hydroprocessed effluent in the first effluent line 70 may be fed to the riser 20 of the FCC reactor 12 to be contacted with catalyst and provide a cracked stream, so the riser 20 and the FCC reactor 12 may be in downstream communication with the first outlet 70*o*. In such an embodiment, the first hydroprocessed effluent would be transported to the hydroprocessing recovery section 50, in an aspect to a hot separator 52, so that a portion of the first hydroprocessed effluent would be directed to the FCC reactor 12 while bypassing the second hydroprocessing zone 74. In such an embodiment, a bypass line 71 transports the first hydroprocessing effluent stream to a hydroprocessing recovery feed line 81 regulated by a control valve on the bypass line 71. Accordingly, when the control valve on the bypass line 71 is open and control valve on a feed line 72 is at least partially closed and preferably completely closed, at least a portion and preferably all of the first hydroprocessing effluent stream in line 70 bypasses the second hydroprocessing zone 74 and enters into the hydroprocessing recovery zone 50. In such a preferred embodiment, the second hydroprocessing zone is out of downstream communication with the first outlet 70*o* of the first hydroprocessing zone 64.

In another embodiment of the FIGURE, the first hydroprocessed effluent stream is fed to a second hydroprocessing zone 74, so the second hydroprocessing zone is in downstream communication with the first outlet 70o of the first hydroprocessing zone 64. In such an embodiment, the control valve on bypass line 71 is closed and the control valve on the feed line 72 is open.

A recycled cracked stream to be described hereinafter in recycle line 110 may be fed to the second hydroprocessing zone 74 in a second feed line 72 through a second inlet 72i. In an embodiment, the first hydroprocessed effluent stream in the first effluent line 70 may also be fed to the second hydroprocessing zone 74 in the second feed line 72 through the second inlet 72i, but the first hydroprocessed effluent stream may be fed to the second hydroprocessing zone 74 via a separate feed line and another inlet. It is contemplated that gases such as hydrogen sulfide and ammonia may be removed from the first hydroprocessed effluent stream in the first effluent line 70 or the second feed line 72 before entering the second hydroprocessing zone 74, but this may not be necessary.

The recycle cracked stream and optionally the first hydroprocessed effluent stream in the second feed line 72 may be mixed with hydrogen from an optional hydrogen line 73 and the mixed recycle cracked stream is fed to the second hydroprocessing zone 74 through the second inlet 72i. Sufficient hydrogen may be present in the first hydroprocessed effluent to make the optional hydrogen line 73 unnecessary. If gases are removed from the first hydroprocessed effluent before it is fed to the second hydroprocessing zone 74 or if the first hydroprocessed effluent is not fed to the second hydroprocessing zone 74, hydrogen will need to be added to the second feed line 72 in line 73. The second hydroprocessing zone 74 may be a hydroprocessing catalyst bed in a hydroprocessing reactor vessel or it may be a hydroprocessing reactor vessel comprising one or more hydroprocessing catalyst beds. In the FIGURE, the second hydroprocessing zone 74 is a hydroprocessing reactor vessel 76 comprising a single bed 78 of hydroprocessing catalyst. It is also contemplated that the first hydroprocessing zone 64 and the second hydroprocessing zone 74 be contained in the same reactor vessel.

Suitable hydroprocessing catalysts for use in the second hydroprocessing zone 74 are any known conventional hydrotreating catalysts and include those which are comprised of at least one Group VIII metal, preferably iron, cobalt and nickel, more preferably nickel and/or cobalt and at least one Group VI metal, preferably molybdenum and tungsten, on a support material having a surface area ranging between 120-270 m$^2$/g, preferably alumina. Other suitable hydrotreating catalysts include noble metal catalysts where the noble metal is selected from palladium and platinum and unsupported multi-metallic catalysts. It is within the scope of the present invention that more than one type of hydrotreating catalyst be used in the same reaction vessel or catalyst bed. The Group VIII metal is typically present in the catalyst in an amount ranging from about 1 to about 10 wt %, preferably from about 2 to about 5 wt %. The Group VI metal will typically be present in the catalyst in an amount ranging from about 1 to about 20 wt %, preferably from about 2 to about 10 wt %.

About 75 to about 95 wt % of the hydroprocessing catalyst in the hydroprocessing unit 30 including the first hydroprocessing zone 64 and the second hydroprocessing zone 74 will be in the first hydroprocessing zone 64. About 5 to about 25 wt % of the hydroprocessing catalyst in the hydroprocessing unit 30 will be in the second hydroprocessing zone 74. The hydroprocessing catalyst in the second hydroprocessing zone 74 will be more active than the hydroprocessing catalyst in the first hydroprocessing zone 64.

If the recycle cracked stream is an LCO stream, the second hydroprocessing zone 74 may be preferably intended to saturate aromatic rings to enable them to be cracked in the FCC unit 10 while preserving a single ring to produce single ring aromatic compounds and light olefins. If the recycle cracked stream is a heavy cycle oil (HCO) stream, the second hydroprocessing zone 74 may be preferably intended to saturate aromatic rings to enable them to be cracked in the FCC unit 10 to make high quality diesel and gasoline.

The second hydroprocessing zone 74 may also further desulfurize and denitrogenate the first hydroprocessing effluent stream in the second feed line 72. The second hydroprocessing zone 74 produces a second hydroprocessed effluent stream in a second effluent line 80 exiting the second hydroprocessing zone through a second outlet 80o.

The first hydroprocessing zone 64 is loaded with a greater fraction of hydrodemetallization catalyst than the second hydroprocessing zone 74. Accordingly, more hydrodemetallization occurs in the first hydroprocessing zone 64 than in the second hydroprocessing zone 74. However, the second hydroprocessing zone 74 is loaded with a greater fraction of aromatic saturation catalyst than the first hydroprocessing zone 64, so more aromatic saturation occurs in the second hydroprocessing zone 74 than in the first hydroprocessing zone 64.

In the event that, the first hydroprocessed effluent bypasses the second hydroprocessing zone 74 or if the fresh hydrocarbon stream in fresh feed line 62 is a lighter feed such as VGO as opposed to atmospheric resid, the second hydroprocessing catalyst may be a hydrocracking catalyst. Hydrocracking catalysts utilize amorphous silica-alumina bases or low-level zeolite bases combined with one or more Group VIII or Group VIB metal hydrogenating components. The zeolite cracking bases are sometimes referred to in the art as molecular sieves and are usually composed of silica, alumina and one or more exchangeable cations such as sodium, magnesium, calcium, rare earth metals, etc. They are further characterized by crystal pores of relatively uniform diameter between about 4 and about 14 Angstroms ($10^{-10}$ meters). It is preferred to employ zeolites having a relatively high silica/alumina mole ratio between about 3 and about 12. Suitable zeolites found in nature include, for example, mordenite, stilbite, heulandite, ferrierite, dachiardite, chabazite, erionite and faujasite. Suitable synthetic zeolites include, for example, the B, X, Y and L crystal types, e.g., synthetic faujasite and mordenite. The preferred zeolites are those having crystal pore diameters between about 8-12 Angstroms, wherein the silica/alumina mole ratio is about 4 to 6. One example of a zeolite falling in the preferred group is synthetic Y molecular sieve.

The active metals employed in the preferred hydrocracking catalysts of the present invention as hydrogenation components are those of Group VIII, i.e., iron, cobalt, nickel, ruthenium, rhodium, palladium, osmium, iridium and platinum. In addition to these metals, other promoters may also be employed in conjunction therewith, including the metals of Group VIB, e.g., molybdenum and tungsten. The amount of hydrogenating metal in the catalyst can vary within wide ranges. Broadly speaking, any amount between about 0.05 percent and about 30 percent by weight may be used. In the case of the noble metals, it is normally preferred to use about 0.05 to about 2 wt-%.

Suitable hydroprocessing reaction conditions in the first hydroprocessing zone 64 and the second hydroprocessing zone 74 include a temperature from about 204° C. (400° F.) to about 399° C. (750° F.), suitably between about 360° C. (680°

F.) to about 382° C. (720° F.) and preferably between about 366° C. (690° F.) to about 377° C. (710° F.), a pressure from about 10.3 MPa (gauge) (1500 psig) to about 20.7 MPa (gauge) (3000 psig) and preferably no more than 17.9 MPa (gauge) (2600 psig) in the first hydroprocessing zone 64 and from about 3.5 MPa (500 psig) to about 10.3 MPa (1500 psig), preferably from about 5.9 MPa (850 psig) to about 7.2 MPa (1050 psig) in the second hydroprocessing zone 74, a liquid hourly space velocity of the fresh hydrocarbonaceous feedstock from about 0.1 $hr^{-1}$ to about 10 $hr^{-1}$ in each hydroprocessing zone. The conditions in the second hydroprocessing zone 74 are set to be less severe so as to predominantly hydrotreat, specifically demetallize and saturate rings, instead of hydrocracking aromatic rings in the second hydroprocessing zone 74. It is preferred to crack in the FCC unit 10 to produce more olefinic materials even if hydrocracking catalyst is used in the second hydroprocessing zone 74.

A hydroprocessing recovery section 50 may be provided in downstream communication with the second effluent line 80 and/or the first effluent line 70 via the bypass line 71 to separate hydroprocessed products from the second hydroprocessed effluent stream to provide an FCC feed stream to the FCC reactor 12 which constitutes a portion of the second hydroprocessed effluent stream in the second effluent line 80. If the first hydroprocessed effluent stream in the first effluent line 70 bypasses the second hydroprocessing zone 74 in bypass line 71 without undergoing hydroprocessing in the second hydroprocessing zone 74, it will also enter the hydroprocessing recovery section 50.

The second hydroprocessed effluent in the second effluent line 80 may be cooled and separated in a hot separator 52 through a hot separator feed line 81. In an aspect, the first hydroprocessed effluent stream in the first effluent line 70 in the bypass line 71 that bypasses the second hydroprocessing zone 74 may also enter the hot separator 52 in the hot separator feed line 81. The bypassing first hydroprocessed effluent stream and the second hydroprocessed effluent stream may enter the hot separator 52 together or separately. The hot separator 52 separates the second hydroprocessed effluent and perhaps the bypassing, first hydroprocessed effluent to provide a vaporous hydrocarbonaceous hot separator overhead stream in an overhead line 54 and a liquid hydrocarbonaceous hot separator bottoms stream in a bottoms line 56. The hot separator 52 is in direct downstream communication with the second hydroprocessing zone 74 and may be in direct downstream communication with the first hydroprocessing zone 64. The hot separator 52 operates at about 177° C. (350° F.) to about 371° C. (700° F.). The hot separator 52 may be operated at a slightly lower pressure than the second hydroprocessing zone 74 accounting for pressure drop of intervening equipment.

The vaporous hydrocarbonaceous hot separator overhead stream in the overhead line 54 may be cooled before entering a cold separator 58. To prevent deposition of ammonium bisulfide or ammonium chloride salts in the line 54 transporting the hot separator overhead stream, a suitable amount of wash water (not shown) may be introduced into line 54.

The cold separator 58 serves to separate hydrogen from hydrocarbon in the hydroprocessing effluent for recycle to the first hydroprocessing zone 64 and/or the second hydroprocessing zone 74 in lines 63 and 73, respectively. The vaporous hydrocarbonaceous hot separator overhead stream may be separated in the cold separator 58 to provide a vaporous cold separator overhead stream comprising a hydrogen-rich gas stream in an overhead line 120 and a liquid cold separator bottoms stream in the bottoms line 122. The cold separator 58, therefore, is in downstream communication with the overhead line 54 of the hot separator 52 and the second hydroprocessing zone 74. The cold separator 58 may be operated at about 100° F. (38° C.) to about 150° F. (66° C.) and just below the pressure of the second hydroprocessing zone 74 and the hot separator 52 accounting for pressure drop of intervening equipment to keep hydrogen and light gases in the overhead and normally liquid hydrocarbons in the bottoms. The cold separator 58 may also have a boot for collecting an aqueous phase in line 124.

The liquid hydrocarbonaceous stream in the hot separator bottoms line 56 may be let down in pressure and flashed in a hot flash drum 126 to provide a hot flash overhead stream of light ends in an overhead line 128 and a heavy liquid stream in a hot flash bottoms line 130. The hot flash drum 126 may be operated at the same temperature as the hot separator 52 but at a lower pressure. The heavy liquid stream in bottoms line 130 may be further fractionated in a hydroprocessing fractionation column 150.

In an aspect, the liquid hydroprocessing effluent stream in the cold separator bottoms line 122 may be let down in pressure and flashed in a cold flash drum 134. The cold flash drum may be in downstream communication with a bottoms line 122 of the cold separator 58. In a further aspect, the vaporous hot flash overhead stream in overhead line 128 may be cooled and also separated in the cold flash drum 134. The cold flash drum 52 may separate the cold separator liquid bottoms stream in line 122 and hot flash vaporous overhead stream in overhead line 128 to provide a cold flash overhead stream of light ends in overhead line 136 and a cold flash bottoms stream in a bottoms line 138. The cold flash bottoms stream in bottoms line 138 may be introduced to the hydroprocessing fractionation column 150. In an aspect, the hydroprocessing fractionation column 150 may be in downstream communication with the cold flash bottoms line 138 and the cold flash drum 134.

The cold flash drum 134 may be in downstream communication with the bottoms line 122 of the cold separator 58, the overhead line 128 of the hot flash drum 126 and the second hydroprocessing zone 74. In an aspect, the hot flash overhead line 128 joins the cold separator bottoms line 122 which feeds the hot flash overhead stream and the cold separator bottoms stream together to the cold flash drum 134. The cold flash drum 134 may be operated at the same temperature as the cold separator 58 but typically at a lower pressure. The aqueous stream in line 124 from the boot of the cold separator may also be directed to the cold flash drum 134. A flashed aqueous stream is removed from a boot in the cold flash drum 134.

The vaporous cold separator overhead stream comprising hydrogen in the overhead line 120 is rich in hydrogen. The cold separator overhead stream in overhead line 120 may be passed through a scrubbing tower 140 to remove hydrogen sulfide and ammonia by use of an absorbent such as an amine absorbent. The scrubbed hydrogen-rich stream may be compressed in a recycle compressor 142 to provide a recycle hydrogen stream and supplemented with make-up hydrogen stream from line 144 to provide the hydrogen stream in hydrogen lines 63 and 73.

The hydroprocessing fractionation column 150 may be in communication with the cold flash drum 134 and the hot flash drum 126 for separating portions of the second hydroprocessing effluent into product streams and an FCC feed stream. The hydroprocessing fractionation column 150 fractionates the cold flash bottoms stream 138 and the hot flash bottoms stream 130 by use of a stripping media such as steam from line 152. The cold flash bottoms stream 138 may enter the hydroprocessing fractionation column 150 at a higher elevation than the hot flash bottoms stream 130. The product streams produced by the hydroprocessing fractionation column 150 may include an overhead LPG stream in overhead line 154, a naphtha stream in line 156, a diesel stream carried in line 158 from a side cut outlet and an FCC stream in a bottoms FCC feed line 160 which may be fed to the FCC unit 10. The overhead stream may be condensed and separated in a receiver with a portion of the condensed liquid being refluxed back to the hydroprocessing fractionation column 150. The net naphtha stream in line 156 may require further processing such as in a naphtha splitter column before blending in the gasoline pool. The product fractionation column 150 may be operated with a bottoms temperature between about 288° C. (550° F.) and about 370° C. (700° F.) and at an overhead pressure between about 30 kPa (gauge) (4 psig) to about 200 kPa (gauge) (29 psig).

The FIGURE shows a typical FCC unit 10, in which a portion of the second hydroprocessed effluent stream comprising the FCC feed stream in the FCC feed line 160 is fed to the FCC reactor 12 to be contacted with a regenerated cracking catalyst. Specifically, in an embodiment, regenerated cracking catalyst entering from a regenerated catalyst standpipe 18 is contacted with the FCC feed stream comprising a portion of the second hydroprocessed effluent in a riser 20 of the FCC reactor 12. A portion of the first hydroprocessed effluent stream in the first hydroprocessed effluent line 70 may also be fed to the FCC reactor 12. Specifically, in an embodiment, the regenerated cracking catalyst is contacted with a portion of the second hydroprocessed effluent in a riser 20 of the FCC reactor 12. In such case, a portion of the first hydroprocessed effluent stream may be fed to the riser 20 of the FCC reactor 12 in the FCC feed stream as part of the second hydroprocessed effluent stream in the second hydroprocessed effluent line 80 or a portion of the first hydroprocessed effluent may be fed to the riser 20 of the FCC reactor 12 while bypassing the second hydroprocessing zone 74 altogether. Portions of the first hydroprocessing effluent stream and the second hydroprocessing effluent stream may be fed to the riser through the same or different distributors 16. In the riser 20 of the FCC reactor 12, the FCC feed stream comprising portions of the first hydroprocessed effluent stream and the second hydroprocessed effluent stream are contacted with catalyst to catalytically crack the FCC feed stream to provide a cracked stream.

The contacting of the first hydroprocessed effluent stream and the second hydroprocessed effluent stream with cracking catalyst may occur in the riser 20 of the FCC reactor 12, extending upwardly to the bottom of a reactor vessel 22. The contacting of feed and catalyst is fluidized by gas from a fluidizing line 24. Heat from the catalyst vaporizes the first hydroprocessed effluent stream and the second hydroprocessed effluent stream, and the hydroprocessed effluent streams are thereafter cracked to lighter molecular weight hydrocarbons in the presence of the cracking catalyst as both are transferred up the riser 20 into the reactor vessel 22. In the FCC reactor 12, saturated naphthenic rings are cracked open and alkyl substituents are cracked from aromatic rings to provide olefinic, aliphatic hydrocarbons in addition to catalytic cracking of the FCC feed stream to conventional cracked products. The cracked stream of hydrocarbon products in the riser 20 is thereafter disengaged from the cracking catalyst using cyclonic separators which may include a rough cut separator 26 and one or two stages of cyclones 28 in the reactor vessel 22. A cracked stream of product gases exit the reactor vessel 22 through a product outlet 31 to line 32 for transport to a downstream FCC recovery section 90.

The outlet temperature of the cracked products leaving the riser 20 should be between about 521° C. (970° F.) and about 593° C. (1100° F.) if petrochemicals are most desired in the FCC product, for example if LCO is the recycle cracked stream in recycle line 110. On the other hand, the outlet temperature of the cracked products leaving the riser 20 should be between about 472° C. (850° F.) and about 538° C. (1000° F.) if diesel and gasoline are most desired in the FCC product, for example if HCO is the recycle cracked stream in recycle line 110.

Inevitable side reactions occur in the riser 20 leaving coke deposits on the catalyst that lower catalyst activity. The spent or coked catalyst requires regeneration for further use. Coked catalyst, after separation from the gaseous cracked product hydrocarbons, falls into a stripping section 34 where steam is injected through a nozzle 35 and distributor to purge any residual hydrocarbon vapor. After the stripping operation, the coked catalyst is fed to the catalyst regenerator 14 through a spent catalyst standpipe 36.

The FIGURE depicts a regenerator 14 known as a combustor. However, other types of regenerators are suitable. In the catalyst regenerator 14, a stream of oxygen-containing gas, such as air, is introduced through an air distributor 38 to contact the coked catalyst, burn coke deposited thereon, and provide regenerated catalyst and flue gas. A stream of air or other oxygen containing gas is fed into the regenerator 14 through line 60. Catalyst and air flow upwardly together along a combustor riser 40 located within the catalyst regenerator 14 and, after regeneration, are initially separated by discharge through a disengager 42. Finer separation of the regenerated catalyst and flue gas exiting the disengager 42 is achieved using first and second stage separator cyclones 44, 46, respectively, within the catalyst regenerator 14. Catalyst separated from flue gas dispenses through diplegs from cyclones 44, 46 while flue gas significantly lighter in catalyst sequentially exits cyclones 44, 46 and exit the regenerator vessel 14 through flue gas outlet 47 in line 48. Regenerated catalyst is recycled back to the reactor riser 20 through the regenerated catalyst standpipe 18.

As a result of the coke burning, the flue gas vapors exiting at the top of the catalyst regenerator 14 in line 48 contain CO, $CO_2$ and $H_2O$, along with smaller amounts of other species. Catalyst regeneration temperature is between about 500° C. (932° F.) and about 900° C. (1652° F.). Both the cracking and regeneration occur at an absolute pressure below about 5 atmospheres.

In the FCC recovery section 90, the gaseous cracked stream in line 32 is fed to a lower section of an FCC main fractionation column 92. The main fractionation column 92 is in downstream communication with the riser 20 and the FCC reactor 12. Several fractions may be separated and taken from the main fractionation column 92 including a heavy slurry oil from the bottoms in line 93, a heavy cycle oil stream in line 94, a light cycle oil in line 95 and an optional heavy naphtha stream in line 98. Gasoline and gaseous light hydrocarbons are removed in overhead line 97 from the main fractionation column 92 and condensed before entering a main column receiver 99. An aqueous stream is removed from a boot in the receiver 99. Moreover, a condensed unstabilized, light naphtha stream is removed in bottoms line 101 while a gaseous light hydrocarbon stream is removed in overhead line 102. Both streams in lines 101 and 102 may enter a vapor recovery section downstream of the main fractionation column 92. A portion of the light naphtha stream in bottoms line 101 may be refluxed to the main fractionation column 92.

The light unstabilized naphtha fraction preferably has an initial boiling point (IBP) in the $C_5$ range; i.e., between about 0° C. (32° F.) and about 35° C. (95° F.), and an end point (EP) at a temperature greater than or equal to about 127° C. (260°

F.). The optional heavy naphtha fraction has an IBP just above about 127° C. (260° F.) and an EP at a temperature above about 204° C. (400° F.), preferably between about 200° C. (392° F.) and about 221° C. (430° F.). The LCO stream has an IBP in the $C_5$ range if no heavy naphtha cut is taken or at about the EP temperature of the heavy naphtha if a heavy naphtha cut is taken and an EP in a range of about 360° C. (680° F.) to about 382° C. (720° F.). The LCO stream may have a T5 in the range of about 213° C. (416° F.) to about 244° C. (471° F.) and a T95 in the range of about 354° C. (669° F.) to about 377° C. (710° F.). The HCO stream has an IBP just above the EP temperature of the LCO stream and an EP in a range of about 385° C. (725° F.) to about 427° C. (800° F.). The HCO stream may have a T5 in the range of about 332° C. (630° F.) to about 349° C. (660° F.) and a T95 in the range of about 382° C. (720° F.) to about 404° C. (760° F.). The heavy slurry oil stream has an IBP just above the EP temperature of the HCO stream and includes everything boiling at a higher temperature.

The main fractionation column 92 has a main outlet 104 from which the recycle cracked stream is taken. The second inlet 72i to the second hydroprocessing zone 74 is in downstream communication with the main outlet 104. In an aspect, the second inlet 72i may be in direct, downstream communication with the main outlet 104. The recycle cracked stream is transported from the main outlet 104 to the second inlet 72i to the second hydroprocessing zone 74 in recycle line 110. The main outlet 104 may be in the side 106 of the main fractionation column 92.

If it is desired to recycle HCO to the second hydroprocessing zone, the main outlet may be the lowest outlet 94o in the side 106 of the main fractionation column 92 from which an HCO stream is taken as the recycle cracked stream in line 94 regulated by a control valve on line 115. By recycling an HCO stream to the second hydroprocessing zone 74 in lines 94, 115 and 110, the yield of diesel and gasoline may be increased in the FCC unit over a yield that would have been obtained without recycling the HCO stream. The diesel stream may be recovered in an LCO product line 112 at a flow rate regulated by a control valve thereon. Gasoline may be recovered from the light naphtha stream in line 101 and the heavy naphtha stream in line 98. It may be desired to make aromatics and light olefins from the HCO stream by recycle to the second hydroprocessing zone 74.

If it is desired to recycle LCO to the second hydroprocessing zone, the main outlet may be the second lowest outlet 95o in the side 106 of the main fractionation column 92 from which an LCO stream is taken as the recycle cracked stream in line 95 regulated by a control valve on line 117. By recycling an LCO stream to the second hydroprocessing zone 74 in lines 95, 117 and 110, the yield of aromatics and propylene may be increased in the FCC unit over a yield that would have been obtained without recycling the LCO stream. Aromatics may be recovered from the heavy naphtha stream in line 98. Propylene may be recovered from the light hydrocarbon stream in line 102. It may be desired to make motor fuels from the LCO stream by recycle to the second hydroprocessing zone 74.

Any or all of lines 94-96 may be cooled and pumped back to the main column 92 to cool the main column typically at a higher location. Specifically, a side stream may be taken from an outlet 96o, 104 in the side 106 of the main fractionation column 92. The side stream may be cooled and returned to the main fractionation column 92 to cool the main fractionation column 92. A heat exchanger may be in downstream communication with the side outlet 96o, 104.

A heavy naphtha stream in line 96 may be returned to the main fractionation column 92 after cooling while a heavy naphtha product stream is taken in line 98.

The outlet in the side 106 of the main fractionation column 92 may be the main outlet 104. The side stream may be cooled to provide a cooled side stream before a recycle cracked stream is taken from it or a return stream taken from the side stream may be cooled after the recycle cracked stream is taken from the side stream to keep the recycle cracked stream at higher temperature and to reduce pump around cooler duty.

In an aspect, the side stream may be the HCO stream in line 94 taken from the lowest, main outlet 94o in the side 106 of the main fractionation column. A portion of the HCO stream may be taken as the recycled cracked stream from line 94 through a control valve on line 115 to the recycle line 110 to the second inlet 72i of the second hydroprocessing zone 74. In an aspect, at least 5 wt-%, suitably at least 50 wt-%, preferably at least 75 wt-% and up to all of the HCO in line 95 may be recycled to the second hydroprocessing zone 74. A return portion of the cooled HCO stream in line 114 may be returned to the main fractionation column to cool the main fractionation column 92. In an aspect, the HCO side stream in line 94 may be cooled to provide a cooled HCO side stream before a recycle cracked stream is taken from it in line 115 to recycle line 110 and the return portion of the cooled HCO side stream may be returned to the main fractionation column 92 in return line 114 as shown in the FIGURE. Alternatively, the HCO side stream may be cooled in the return line 114 after the recycle cracked stream is taken from it in line 115 to recycle line 110 to keep the recycle cracked stream in recycle line 110 at higher temperature and to reduce pump around cooler duty. A heat exchanger may be in downstream communication with the lowest, main outlet 94o.

In a further aspect, the side stream may be the LCO stream in line 95 taken from the second lowest, main outlet 95o in the side 106 of the main fractionation column 92. A portion of the LCO stream may be taken as the recycled cracked stream from line 95 through a control valve on line 117 to the recycle line 110 to the second inlet 72i of the second hydroprocessing zone 74. In an aspect, at least 5 wt-%, suitably at least 50 wt-%, preferably at least 75 wt-% and up to all of the LCO in line 95 may be recycled to the second hydroprocessing zone 74. An unrecycled portion of the cooled LCO stream in line 116 may be split between a return portion stream that is returned to the main fractionation column to cool the main fractionation column 92 and an LCO product stream in the LCO product line 112 through a control valve thereon. In an aspect, the LCO side stream may be cooled in line 95 to provide a cooled LCO side stream before a recycle cracked stream is taken from it in line 117 to the recycle line 110 and the return portion of the cooled LCO side stream may be returned to the main fractionation column 92 in return line 116 as shown in the FIGURE. Alternatively, the LCO side stream may be cooled after the recycle cracked stream is taken from it in line 117 to the recycle line 110 and before or after the LCO product stream in line 112 is taken from the LCO side stream in line 116 to keep the recycle cracked stream in recycle line 110 at higher temperature and to reduce pump around cooler duty. For example, the cooling may occur in the return line 116 upstream or downstream of the inlet to the product line 112. A heat exchanger may be in downstream communication with the second lowest, main outlet 95o.

It is contemplated that the recycle line 110 may transport a recycle cracked stream comprising at least a portion of the LCO side stream from the second lowest, main outlet 95o and at least a portion of the HCO side stream from the lowest main outlet 94o to the second hydroprocessing zone 74 via the second inlet 72i.

EXAMPLES

Example 1

We simulated a hydroprocessing unit upstream of an FCC unit to demonstrate the capability of the described apparatus and process. The simulated operation utilized one hydroprocessing unit and one FCC reactor and a feed rate of 142,267 kg/hr (25,000 bpsd, 313,645 lb/hr) of atmospheric residue fresh feedstock to the upstream hydroprocessing unit. The yields of propylene, depentanized gasoline, aromatics and LCO per charge of feed for each case are in Table 1.

TABLE 1

| Case | Propylene | | | Depentanized Gasoline | | | Aromatics in Depentanized Gasoline |
|---|---|---|---|---|---|---|---|
| | (kg/hr) | (lb/hr) | wt % | (kg/hr) | (lb/hr) | wt % | wt % |
| Base | 17319 | 38182 | 12.2 | 34787 | 76693 | 24.5 | 35.8 |
| LCO Recycle | 18762 | 41363 | 11.9 | 38686 | 85287 | 24.5 | 37.5 |
| Increment | 1443 | 3181 | 1.0 | 3899 | 8594 | 2.7 | 1.6 |

In this LCO recycle case, 15,488 kg/hr (2,651 bpsd, 34,145 lb/hr) LCO was recycled to the hydroprocessing unit to provide an overall feed rate of 157,755 kg/hr (27,651 bpsd, 347,790.2 lb/hr) to the hydroprocessing unit. The increment wt-% was determined by the difference in yield over the feed rate of fresh feed. Consequently, the recycle of LCO provides valuable incremental increases of 1 wt % propylene, 2.7 wt % gasoline and 1.6 wt % aromatics.

Example 2

We simulated a hydroprocessing unit upstream of an FCC unit to further demonstrate the capability of the described apparatus and process with the recycle of HCO. The simulated operation utilized one hydroprocessing unit and one FCC reactor and a feed rate to the hydroprocessing unit of 466,921 kg/hr (1,029,383 lb/hr) of atmospheric residue fresh feedstock. Recycling HCO to the hydroprocessing unit and the FCC unit increased the feed rates to the hydroprocessing unit to (479,528 kg/hr) 1,057,176 lb/hr. We have discovered that the hydroprocessed atmospheric residue feed and recycled HCO have the same properties as the hydroprocessed atmospheric residue feed. Accordingly, the incremental increases in the products are as shown in Table 2.

TABLE 2

| Case | Units | Base | HCO Recycle | Increment |
|---|---|---|---|---|
| Propylene | (kg/hr) | 52,448 | 53,851 | 1,403 |
| | (lb/hr) | 115,629 | 118,721 | 3,092 |
| | wt % | 11.2 | 11.2 | 0.3 |
| 95 RON Euro V Gasoline | (kg/hr) | 152,170 | 156,278 | 4,109 |
| | (lb/hr) | 335,476 | 344,534 | 9,058 |
| | wt % | 32.6 | 32.6 | 0.8 |
| Euro V Diesel | (kg/hr) | 69,781 | 71,498 | 1,880 |
| | (lb/hr) | 153,841 | 157,625 | 4,144 |
| | wt % | 14.9 | 14.9 | 0.4 |
| LPG | (kg/hr) | 85,493 | 87,801 | 2,308 |
| | (lb/hr) | 188,480 | 193,568 | 5,089 |
| | wt % | 18.3 | 18.3 | 0.4 |

The increment wt-% was again determined by the difference in yield over the feed rate of fresh feed. Recycle of HCO can boost propylene, gasoline and diesel yields remarkably.

Specific Embodiments

While the following is described in conjunction with specific embodiments, it will be understood that this description is intended to illustrate and not limit the scope of the preceding description and the appended claims.

A first embodiment of the invention is a process for catalytically cracking hydrocarbons comprising feeding a fresh hydrocarbon feed stream to a first hydroprocessing zone to hydroprocess the hydrocarbon feed stream to provide a first hydroprocessed effluent stream; feeding a recycle cracked stream to a second hydroprocessing zone to hydroprocess the recycle cracked stream and provide a second hydroprocessed effluent stream; feeding the first hydroprocessed effluent to the second hydroprocessing zone or feeding a portion of the first hydroprocessed effluent to an FCC reactor and contacting said portion of the first hydroprocessed effluent stream with catalyst to catalytically crack said first hydroprocessed effluent to provide a cracked stream; feeding a portion of the second hydroprocessed effluent stream to an FCC reactor and contacting the portion of the second hydroprocessed effluent stream with catalyst to catalytically crack the second hydroprocessed effluent to provide a cracked stream; disengaging the catalyst from the cracked stream; and separating the recycled cracked stream from the cracked stream. An embodiment of the invention is one, any or all of prior embodiments in this paragraph up through the first embodiment in this paragraph further comprising separating hydroprocessed products from the second hydroprocessed effluent stream to provide an FCC feed stream and feeding the FCC feed stream as the portion of the second hydroprocessed effluent stream to the FCC reactor. An embodiment of the invention is one, any or all of prior embodiments in this paragraph up through the first embodiment in this paragraph further comprising feeding the cracked stream to a main fractionation column and taking the recycle cracked stream from an outlet in a side of the main fractionation column. An embodiment of the invention is one, any or all of prior embodiments in this paragraph up through the first embodiment in this paragraph further comprising taking a side stream from the outlet in the side of the main fractionation column, cooling the side stream to provide a cooled side stream, taking a portion of the cooled side stream as the recycle cracked stream and returning another portion of the cooled side stream to the main fractionation column. An embodiment of the invention is one, any or all of prior embodiments in this paragraph up through the first embodiment in this paragraph further comprising taking a side stream from the outlet in the side of the main fractionation column, taking a portion of the side stream as the recycle cracked stream; cooling another portion of the side stream to provide a cooled side stream and returning the cooled another portion of the side stream to the main fractionation column. An embodiment of the invention is one, any or all of prior embodiments in this paragraph up through the first embodiment in this paragraph wherein the recycle cracked stream is a light cycle oil stream. An embodiment of the invention is one, any or all of prior embodiments in this paragraph up through the first embodiment in this paragraph further comprising increasing a yield of aromatics and propylene compared to a yield without feeding a recycle cracked stream to the second hydroprocessing zone. An embodiment of the invention is one, any or all of prior embodiments in this paragraph up through the first embodiment in this paragraph wherein the recycle cracked stream is a heavy cycle oil stream. An embodiment of the invention is one, any or all of prior embodiments in this paragraph up through the first embodiment in this paragraph further comprising increasing a yield of diesel compared to a yield without feeding a recycle cracked stream to the second hydroprocessing zone. An embodiment of the invention is one, any or all of prior embodiments in this paragraph up through the first embodiment in this paragraph wherein more hydrodemetallization occurs in the first hydroprocessing zone than in the second hydroprocessing zone. An embodiment of the invention is one, any or all of prior embodiments in this paragraph up through the first embodiment in this paragraph wherein more aromatic saturation occurs in the second hydroprocessing zone than in the first hydroprocessing zone.

A second embodiment of the invention is a process for catalytically cracking hydrocarbons comprising feeding a fresh hydrocarbon feed stream to a first hydroprocessing zone to hydroprocess the hydrocarbon feed stream to provide a first hydroprocessed effluent stream; feeding a recycle cracked stream and the first hydroprocessed effluent stream to a second hydroprocessing zone to hydroprocess the recycle cracked stream and the first hydroprocessed effluent stream to provide a second hydroprocessed effluent stream; separating hydroprocessed products from the second hydroprocessed effluent stream to provide an FCC feed stream; feeding the FCC feed stream to an FCC reactor and contacting the FCC feed stream with catalyst to catalytically crack the FCC feed stream to provide a cracked stream; disengaging the catalyst from the cracked stream; and separating the recycled cracked stream from the cracked stream. An embodiment of the invention is one, any or all of prior embodiments in this paragraph up through the second embodiment in this paragraph further comprising feeding the cracked stream to a main fractionation column and taking the recycle cracked stream from an outlet in a side of the main fractionation column. An embodiment of the invention is one, any or all of prior embodiments in this paragraph up through the second embodiment in this paragraph wherein the recycle cracked stream is a light cycle oil stream and increasing a yield of aromatics and propylene compared to a yield without feeding a recycle cracked stream to the second hydroprocessing zone. An embodiment of the invention is one, any or all of prior embodiments in this paragraph up through the second embodiment in this paragraph wherein the recycle cracked stream is a heavy cycle oil stream and increasing a yield of diesel compared to a yield without feeding a recycle cracked stream to the second hydroprocessing zone. An embodiment of the invention is one, any or all of prior embodiments in this paragraph up through the second embodiment in this paragraph wherein more hydrodemetallization occurs in the first hydroprocessing zone than in the second hydroprocessing zone. An embodiment of the invention is one, any or all of prior embodiments in this paragraph up through the second embodiment in this paragraph wherein more aromatic saturation occurs in the second hydroprocessing zone than in the first hydroprocessing zone.

A third embodiment of the invention is a process for catalytically cracking hydrocarbons comprising feeding a fresh hydrocarbon feed stream to a first hydroprocessing zone to hydroprocess the hydrocarbon feed stream to provide a first hydroprocessed effluent stream; feeding a recycle cracked stream to a second hydroprocessing zone to hydroprocess the recycle cracked stream and provide a second hydroprocessed effluent stream; separating hydroprocessed products from the first hydroprocessed effluent stream and the second hydroprocessed effluent stream to provide an FCC feed stream; feeding the FCC feed stream to an FCC reactor and contacting the FCC feed stream with catalyst to catalytically crack the FCC feed stream to provide a cracked stream; disengaging the catalyst from the cracked stream; and separating the recycled cracked stream from the cracked stream. An embodiment of the invention is one, any or all of prior embodiments in this paragraph up through the third embodiment in this paragraph further comprising feeding the cracked stream to a main fractionation column and taking the recycle cracked stream from an outlet in a side of the main fractionation column. An embodiment of the invention is one, any or all of prior embodiments in this paragraph up through the third embodiment in this paragraph wherein more hydrodemetallization occurs in the first hydroprocessing zone than in the second hydroprocessing zone; and more aromatic saturation occurs in the second hydroprocessing zone than in the first hydroprocessing zone.

A fourth embodiment of the invention is an apparatus for catalytically cracking hydrocarbons comprising a first hydroprocessing zone with an first inlet and a first outlet, the first inlet being in communication with a source of a fresh hydrocarbon feed stream; a second hydroprocessing zone with a second inlet and a second outlet; an FCC reactor in communication with the first outlet and the second outlet; and a main fractionation column in communication with the FCC reactor; the main fractionation column having a main outlet, the second inlet being in downstream communication with the main outlet. An embodiment of the invention is one, any or all of prior embodiments in this paragraph up through the fourth embodiment in this paragraph wherein the main outlet is in a side of the main fractionation column. An embodiment of the invention is one, any or all of prior embodiments in this paragraph up through the fourth embodiment in this paragraph wherein the main outlet is the lowest outlet in the side of the main fractionation column. An embodiment of the invention is one, any or all of prior embodiments in this paragraph up through the fourth embodiment in this paragraph wherein the main outlet is the second lowest outlet in the side of the main fractionation column. An embodiment of the invention is one, any or all of prior embodiments in this paragraph up through the fourth embodiment in this paragraph further comprising a heat exchanger in communication with the main outlet. An embodiment of the invention is one, any or all of prior embodiments in this paragraph up through the fourth embodiment in this paragraph wherein the second hydroprocessing zone is in communication with the first outlet. An embodiment of the invention is one, any or all of prior embodiments in this paragraph up through the fourth embodiment in this paragraph wherein the FCC reactor is in direct communication with the first outlet. An embodiment of the invention is one, any or all of prior embodiments in this paragraph up through the fourth embodiment in this paragraph wherein the first hydroprocessing zone is loaded with a greater fraction of hydrodemetallization catalyst than the second hydroprocessing zone. An embodiment of the invention is one, any or all of prior embodiments in this paragraph up through the fourth embodiment in this paragraph wherein the second hydroprocessing zone is loaded with a greater fraction of aromatic saturation catalyst than the first hydroprocessing zone. An embodiment of the invention is one, any or all of prior embodiments in this paragraph up through the fourth embodiment in this paragraph wherein the first hydroprocessing zone and the second hydroprocessing zone is contained in the same reactor vessel. An embodiment of the invention is one, any or all of prior embodiments in this paragraph up through the fourth embodiment in this paragraph wherein the second inlet is in direct communication with the main outlet.

A fifth embodiment of the invention is an apparatus for catalytically cracking hydrocarbons comprising a first hydroprocessing zone with an first inlet and a first outlet, the first inlet being in communication with a source of a fresh hydrocarbon feed stream; a second hydroprocessing zone with a second inlet and a second outlet, the second hydroprocessing zone being in communication with the first outlet; a FCC reactor in communication with the second outlet; and a main fractionation column in communication with the FCC reactor; the main fractionation column having a main outlet, the second inlet being in downstream communication with the main outlet. An embodiment of the invention is one, any or all of prior embodiments in this paragraph up through the fifth embodiment in this paragraph wherein the main outlet is in a side of the main fractionation column. An embodiment of the invention is one, any or all of prior embodiments in this paragraph up through the fifth embodiment in this paragraph wherein the main outlet is the lowest outlet in the side of the main fractionation column. An embodiment of the invention is one, any or all of prior embodiments in this paragraph up through the fifth embodiment in this paragraph wherein the main outlet is the second lowest outlet in the side of the main fractionation column.

A sixth embodiment of the invention is an apparatus for catalytically cracking hydrocarbons comprising a first hydroprocessing zone with an first inlet and a first outlet, the first inlet being in communication with a source of a fresh hydrocarbon feed stream; a second hydroprocessing zone with a second inlet and a second outlet; a FCC reactor in communication with the first outlet and the second outlet; and a main fractionation column in communication with the FCC reactor; the main fractionation column having a main outlet in a side of the main fractionation column, the second inlet being in downstream communication with the main outlet. An embodiment of the invention is one, any or all of prior embodiments in this paragraph up through the sixth embodiment in this paragraph wherein the second hydrotreating zone is in communication with the first outlet. An embodiment of the invention is one, any or all of prior embodiments in this paragraph up through the sixth embodiment in this paragraph wherein the second hydroprocessing zone is not in downstream communication with the first outlet. An embodiment of the invention is one, any or all of prior embodiments in this paragraph up through the sixth embodiment in this paragraph wherein the main outlet is the lowest outlet in the side of the main fractionation column. An embodiment of the invention is one, any or all of prior embodiments in this paragraph up through the sixth embodiment in this paragraph wherein the main outlet is the second lowest outlet in the side of the main fractionation column.

Without further elaboration, it is believed that by using the preceding description, one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. An apparatus for catalytically cracking hydrocarbons comprising:
   a first hydroprocessing zone with a first inlet and a first outlet, the first inlet being in communication with a source of a fresh hydrocarbon feed stream;
   a second hydroprocessing zone with a second inlet and a second outlet, the second inlet being in selective downstream communication with the first outlet;
   an FCC reactor with an inlet and an outlet, the FCC reactor inlet in downstream communication with the first outlet and the second outlet; and
   a main fractionation column in downstream communication with the FCC reactor outlet; said main fractionation column having a main outlet, the second inlet being in downstream communication with said main outlet.

2. The apparatus of claim 1 wherein said main outlet is in a side of said main fractionation column.

3. The apparatus of claim 2 wherein said main outlet is the lowest outlet in the side of said main fractionation column.

4. The apparatus of claim 2 wherein said main outlet is the second lowest outlet in the side of said main fractionation column.

5. The apparatus of claim 2 further comprising a heat exchanger in communication with said main outlet.

6. The apparatus of claim 1 wherein the FCC reactor inlet is in direct communication with the first outlet.

7. The apparatus of claim 1 wherein said first hydroprocessing zone is loaded with a greater fraction of hydrodemetallization catalyst than said second hydroprocessing zone.

8. The apparatus of claim 1 wherein said second hydroprocessing zone is loaded with a greater fraction of aromatic saturation catalyst than said first hydroprocessing zone.

9. The apparatus of claim 8 wherein said first hydroprocessing zone and said second hydroprocessing zone are contained in the same reactor vessel.

10. The apparatus of claim 1 wherein the second inlet is in direct communication with said main outlet.

11. The apparatus of claim 1 wherein the FCC reactor inlet is in selective communication with the first outlet.

12. The apparatus of claim 1 further comprising a hydroprocessing recovery section with an inlet and an outlet, the hydroprocessing recovery section inlet in selective downstream communication with the first outlet and in downstream communication with the second outlet, and the FCC reactor inlet in downstream communication with the hydroprocessing recovery section outlet.

13. An apparatus for catalytically cracking hydrocarbons comprising:
   a first hydroprocessing zone with a first inlet and a first outlet, the first inlet being in communication with a source of a fresh hydrocarbon feed stream;
   a second hydroprocessing zone with a second inlet and a second outlet, the second inlet not being in downstream communication with the first outlet;
   a FCC reactor with an inlet and an outlet, the FCC reactor inlet in downstream communication with the first outlet and the second outlet; and
   a main fractionation column in downstream communication with the FCC reactor outlet; said main fractionation column having a main outlet, the second inlet being in downstream communication with said main outlet.

14. The apparatus of claim 13 wherein said main outlet is in a side of said main fractionation column.

15. The apparatus of claim 13 wherein said main outlet is the lowest outlet in the side of said main fractionation column.

16. The apparatus of claim 13 wherein said main outlet is the second lowest outlet in the side of said main fractionation column.

17. An apparatus for catalytically cracking hydrocarbons comprising:
a first hydroprocessing zone with a first inlet and a first outlet, the first inlet being in communication with a source of a fresh hydrocarbon feed stream;
a second hydroprocessing zone with a second inlet and a second outlet, the second inlet being in selective downstream communication with the first outlet;
a FCC reactor with an inlet and an outlet, the FCC reactor inlet in downstream communication with the first outlet and the second outlet; and
a main fractionation column in downstream communication with the FCC reactor outlet; said main fractionation column having a main outlet in a side of said main fractionation column, the second inlet being in downstream communication with said main outlet.

18. The apparatus of claim 17 wherein said second hydroprocessing zone is not in downstream communication with the first outlet.

19. The apparatus of claim 17 wherein said main outlet is the lowest outlet in the side of said main fractionation column.

20. The apparatus of claim 17 wherein said main outlet is the second lowest outlet in the side of said main fractionation column.

* * * * *